US007899718B2

(12) United States Patent
Howell et al.

(10) Patent No.: US 7,899,718 B2
(45) Date of Patent: Mar. 1, 2011

(54) SYSTEM AND METHOD OF FACILITATING TRANSACTIONS OVER A COMPUTER NETWORK

(75) Inventors: Cheryl Anne Howell, San Antonio, TX (US); Scott Ivan Bureau, San Antonio, TX (US); Thomas David Gaitan, San Antonio, TX (US); Joseph Richard Gloria, San Antonio, TX (US); Robert Joseph Hotard, San Antonio, TX (US); Steven Michael Large, San Antonio, TX (US); Jeffry Leon Post, San Antonio, TX (US); Susan Yonker Price, San Antonio, TX (US); Bonnie Michelle Rose, San Antonio, TX (US); Michael John Rothe, D'Hanis, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1999 days.

(21) Appl. No.: 10/209,759

(22) Filed: Aug. 1, 2002

(65) Prior Publication Data
US 2003/0105674 A1 Jun. 5, 2003

Related U.S. Application Data

(60) Provisional application No. 60/337,816, filed on Dec. 5, 2001.

(51) Int. Cl.
*G06Q 30/00* (2006.01)
*G06Q 10/00* (2006.01)
*G06Q 40/00* (2006.01)

(52) U.S. Cl. .................. 705/26.7; 705/1.1; 705/35

(58) Field of Classification Search ............... 705/26
See application file for complete search history.

(56) References Cited

U.S. PATENT DOCUMENTS

| 5,291,398 | A | | 3/1994 | Hagan ............................. 705/4 |
| 5,602,936 | A | * | 2/1997 | Green et al. ................. 382/140 |
| 5,644,727 | A | | 7/1997 | Atkins ............................ 705/40 |
| 5,852,811 | A | | 12/1998 | Atkins ........................ 705/36 R |
| 5,864,827 | A | | 1/1999 | Wilson ........................... 705/35 |
| 5,884,285 | A | | 3/1999 | Atkins ........................ 705/36 R |
| 5,911,135 | A | | 6/1999 | Atkins ........................ 705/36 R |
| 5,911,136 | A | | 6/1999 | Atkins ........................ 705/36 R |
| 5,913,202 | A | | 6/1999 | Motoyama ................. 705/36 R |
| 5,933,816 | A | | 8/1999 | Zeanah et al. .................. 705/35 |

(Continued)

FOREIGN PATENT DOCUMENTS

WO WO 00/72219 A1 * 11/2000

OTHER PUBLICATIONS

Anonymous, Information found on the website of InsureMarket, Feb. 29, 2000, pp. 10.*

*Primary Examiner* — Asfand Sheikh
(74) *Attorney, Agent, or Firm* — Brooks, Cameron & Huebsch, PLLC

(57) ABSTRACT

On-line systems and methods allow customers to view and purchase financial services products, such as annuities, and the like, which are subject to State regulations and require the use of State mandated forms. Customers are able to view State-specific forms and to electronically sign such forms to make a purchase.

8 Claims, 4 Drawing Sheets

U.S. PATENT DOCUMENTS

| | | | |
|---|---|---|---|
| 5,987,434 A | 11/1999 | Libman | 705/36 R |
| 6,026,382 A | 2/2000 | Kalthoff | 705/35 |
| 6,076,072 A | 6/2000 | Libman | 705/36 R |
| 6,233,565 B1 | 5/2001 | Lewis et al. | 705/35 |
| 6,272,528 B1 | 8/2001 | Cullen et al. | 705/36 R |
| 6,275,807 B1 | 8/2001 | Schirripa | 705/36 R |
| 6,321,212 B1 | 11/2001 | Lange | 705/36 R |
| 6,526,386 B1 * | 2/2003 | Chapman et al. | 705/4 |
| 7,472,088 B2 * | 12/2008 | Taylor et al. | 705/38 |
| 2002/0010599 A1 * | 1/2002 | Levison | 705/4 |
| 2002/0120477 A1 * | 8/2002 | Jinnett | 705/4 |
| 2003/0036912 A1 * | 2/2003 | Sobotta et al. | 705/1 |
| 2003/0046208 A1 * | 3/2003 | Lubking et al. | 705/36 |
| 2003/0055737 A1 * | 3/2003 | Pope et al. | 705/26 |

* cited by examiner

SYSTEM AND METHOD OF FACILITATING TRANSACTIONS OVER A COMPUTER NETWORK

This patent application claims priority from a provisional patent application entitled "Online Purchase Process," Ser. No. 60/337,816, having a filing date of Dec. 5, 2001.

FIELD OF THE INVENTION

The present invention relates generally to electronic commerce and, more particularly, to a system and method of facilitating the purchase of financial products over a computer network.

BACKGROUND OF THE INVENTION

The Internet has emerged as, a large community of electronically-connected users located around the world who readily and regularly exchange significant amounts of information. The Internet continues to serve its original purpose of providing access and exchange of information among government agencies, laboratories, and universities for research and education. In addition, the Internet has evolved to serve a variety of interests and forums that extend beyond its original goals.

There is growing interest in electronic commerce, whereby individuals and/or entities can transact business with other individuals and/or entities via interconnected networks, such as the Internet. Electronic commerce offers advantages to both buyers and vendors. With electronic commerce, a buyer may access many more vendors than could be achieved via conventional methods of commerce. Thus, with electronic commerce, buyers can potentially achieve a lower purchase price, as well as a wider selection of goods and/or services. By the same token, electronic commerce affords vendors a larger market place, and access to a larger number of buyers.

Much of the electronic commerce presently conducted between buyers and vendors occurs by the exchange of data in the form of graphics and/or text. Typically, a buyer seeking to purchase goods and/or services electronically initiates the transaction by first establishing a data link with the vendor. For example, if the vendor possesses a web site on the World-Wide Web portion of the Internet, the buyer initially makes a connection via a computer, to an Internet Service Provider. Once connected, the buyer then enters the Universal Resource Locator (URL) associated with the vendor to access that vendor's web site. After the buyer has accessed the vendor's web site, the buyer enters the information needed to complete the transaction.

Today, the Internet is widely utilized in connection with the sale of financial products. Financial institutions, such as banks and insurance companies, provide online financial product information for browsing by the customer. For a majority of financial products, online purchasing is fairly straightforward. Once the customer has decided to purchase a particular product, he or she is required to enter personal information upon a series of forms in order to complete the transaction.

However, some financial products are subject to specialized legal requirements which makes conducting an online transaction more difficult. Such laws typically require the customer to review and sign one or more State mandated forms in order to purchase financial products, such as annuities. Known systems have dealt with this requirement by allowing the customer to download required forms so that he or she may print each form as a hard copy and sign each by hand. The forms are then sent to the financial institution by regular mail so that the transaction may be consummated.

Other known systems, such as that described in U.S. Pat. No. 6,233,565, allow for the submission of true digital signatures. Unfortunately, this method requires both the vendor and the customer to obtain and utilize specialized authentication software in order to complete the transaction. There remains a need for a system and method of facilitating the online purchase of financial products that allows the customer to consummate financial transactions without the use of specialized authentication software.

Further, each State of the United States promulgates its own rules regarding which annuities State residents may purchase and how such purchases must be consummated. There remains a need for a system and method of facilitating the online purchase of products capable of 1) determining an online customer's State of residence, 2) identifying which products may be purchased by the online customer given the customer's State of residence, 3) providing the customer with online forms having a substantially identical appearance to those mandated by applicable State law and 4) providing a method of consummating online transactions that does not require the buyer to obtain specialized equipment.

SUMMARY OF THE INVENTION

Accordingly, the present invention provides a system and method of facilitating the online purchase of products. The present invention allows financial products, such as annuities, to be browsed and purchased online. The present invention is capable of receiving product information, storing same and profiling each financial product according to geographical region. When a customer accesses the website utilized by the present invention, his or her address information is used to determine a State of residence. Thus, upon request by the customer, the present invention displays financial product information applicable to the State in which the customer resides.

If the customer decides to apply for a financial product online, the invention authenticates the customer's identity and provides a series of data gathering fields within which the customer may enter additional purchasing information. The purchasing information is then displayed for verification by the customer. State-specific financial product forms are stored in a repository in image-type format (for example, Portable Document Format (PDF) substantially identical to the forms as they would appear if presented to the customer as a hard copy. Thus, once the customer has verified the correct purchasing information, the invention imports the purchasing information into the appropriate image-type State-specific form and displays same to the customer. This ensures that what the customer sees is substantially identical to the form utilized in the customer's State for mailing traditional financial product sales packets.

Once the customer has reviewed the appropriate image-type forms, he or she may electronically "sign" each document so that the financial product purchase may be consummated. To accomplish this, the invention provides a signature button. When the customer selects the signature button, the system navigates the customer to the next form to be signed, completed with the appropriate data, and accompanied by the appropriate disclaimers.

Each time the signature button is selected, a unique log record is entered into a repository. The entry contains the customer number, form number, and the time and date the form was signed online. The time and date stamp of the e-signature is also recorded in the signature block on each image-type form. Selecting the signature button causes an electronic copy of the completed form and its e-signature record to be saved.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein.

DETAILED DESCRIPTION OF THE INVENTION

The present invention is herein described as a method of facilitating transactions over a computer network using an e-commerce site and as a computer system for facilitating transactions over a computer network. In one embodiment, each repository comprises one or more storage devices capable of storing electronic data.

Referring to the Figures, the present invention is capable of determining an online customer's geographical area of residence, identifying which products are available for purchase by the online customer given his or her geographical area, displaying one or more electronic forms having a substantially identical appearance to those mandated by applicable law, and providing a unique method of authorizing online product purchases.

Figure 1:
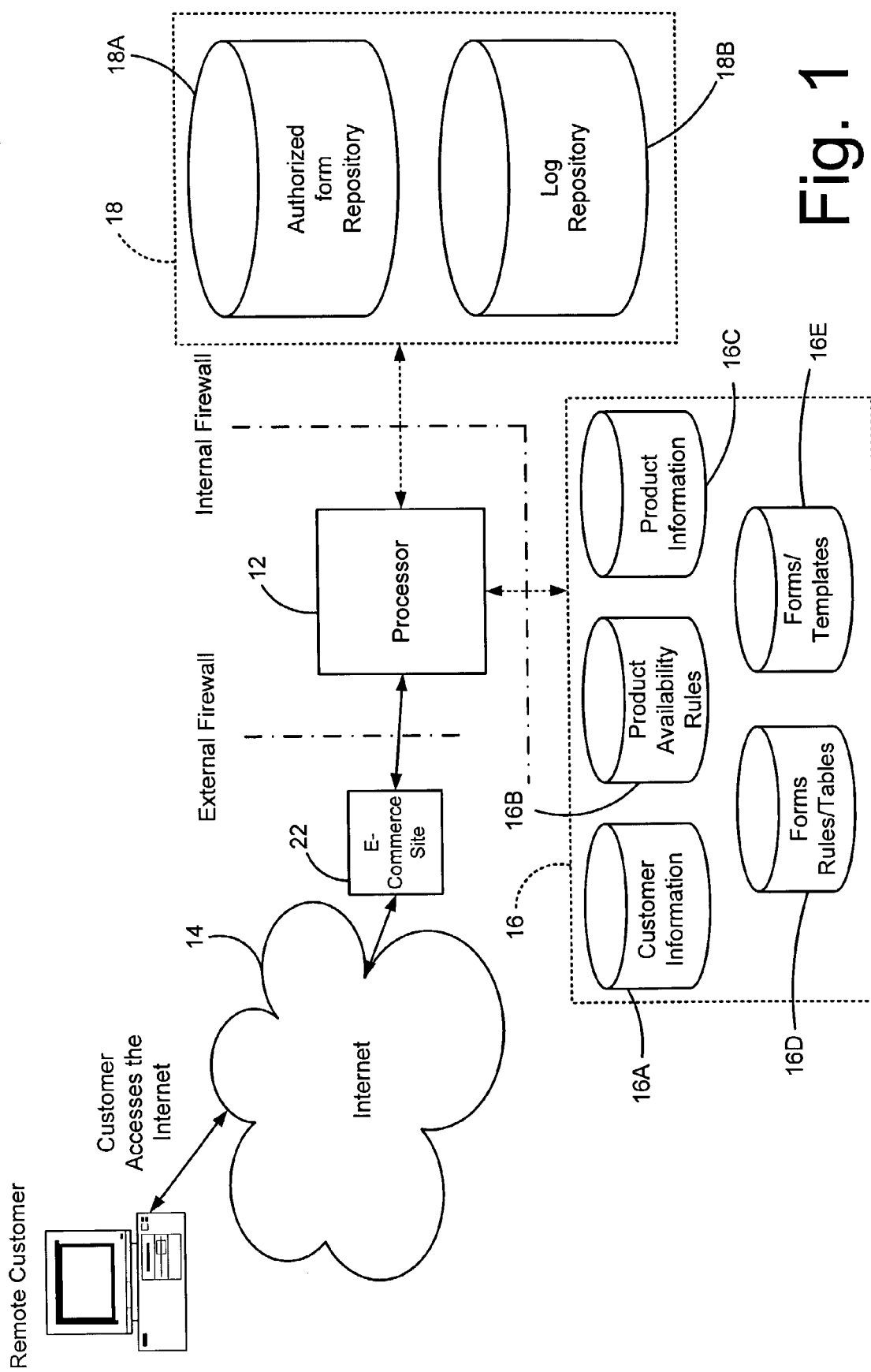
FIG. 1 is a component diagram of one embodiment of the present invention.

Referring to FIG. 1, the present invention is equipped with a processor (12) capable of directing and facilitating commercial activity over a computer network (14). In one embodiment, the processor (12) of the present invention is electronically coupled to one or more repositories (16 and 18 respectively) capable of storing electronic data. Each repository, as described in greater detail below, may be any device capable of storing and/or maintaining data including, but not limited to storage devices, databases, files, memories or arrays. In one embodiment, a pre-transaction repository (16) is used to store background information required to facilitate and complete online product purchases. Specifically, the pre-transaction repository (16) is capable of housing background information necessary to complete an online transaction. For example, the pre-transaction repository may contain customer information such as name, address, phone number, etc., for a plurality of customers that may be retrieved as required. Further, the pre-transaction repository (16) may be used to store product information relating to a plurality of products available for purchase.

The pre-transaction repository is described in a singular context for ease of illustration only. Thus, it should be understood that the pre-transaction repository (16) may comprise one or more separate repositories (16A, 16B, 16C, 16D, 16E, respectively) each designed to retain electronic information. In one embodiment, the pre-transaction repository (16) comprises a customer information repository (16A), a product availability rules repository (16B), a product information repository (16C), a forms rules/tables repository (16D), and a forms/templates repository (16E).

Figure 2:
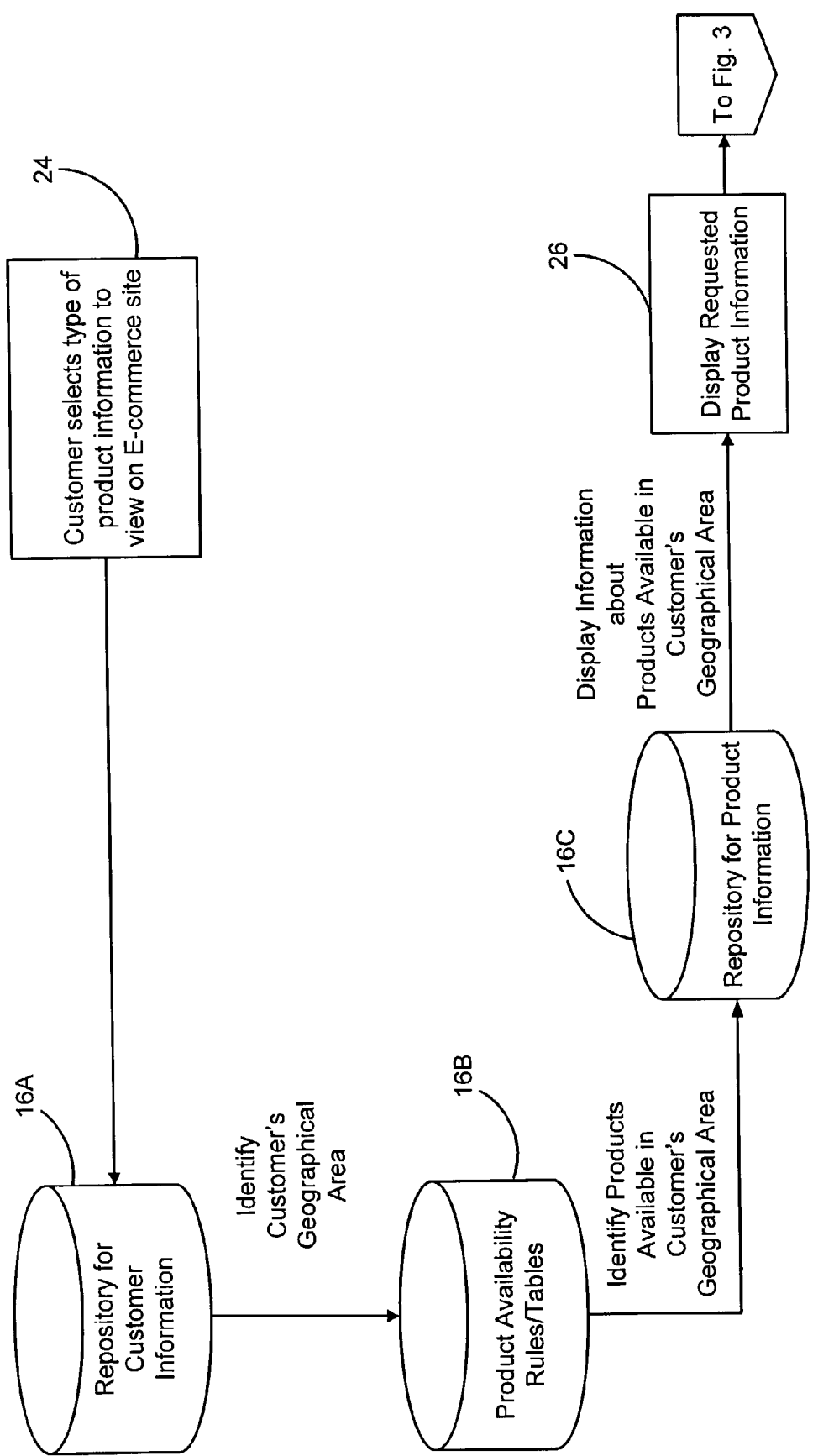
FIG. 2 is a process flow diagram illustrating the retrieval and display of geographical area specific product information in one embodiment of the present invention.

Referring to FIG. 2, upon accessing the e-commerce site (22) of the present invention, the customer is allowed to review general product information. Specifically, the customer is given access to a host of product information describing a wide array of available products. In one embodiment, the present invention provides comparison information to assist the customer in choosing between various products.

Customer information is utilized to determine the geographical area attributable to the identified customer. If the customer provides product specific information, i.e., information denoting a particular type or category of product(s) that the customer is interested in applying for, the processor (12) of the present invention will search the pre-transaction repository (16) for products that are available for purchase in the customer's geographical area. In one embodiment, the processor (12) of the present invention is designed to search product availability according to the customer's State of residence. Product information available for purchase by the customer may then be displayed upon the e-commerce site (22) of the present invention for review by the customer, as illustrated by box (26).

To determine the availability of product(s) within one or more geographical areas, the present invention maintains one or more product availability rules defining which products are available in a plurality of geographical areas, as illustrated by box (16B). In one embodiment, the pre-transaction repository (16) contains stored product availability rules (16B) that may be searched by the processor (12) as required.

Figure 3:
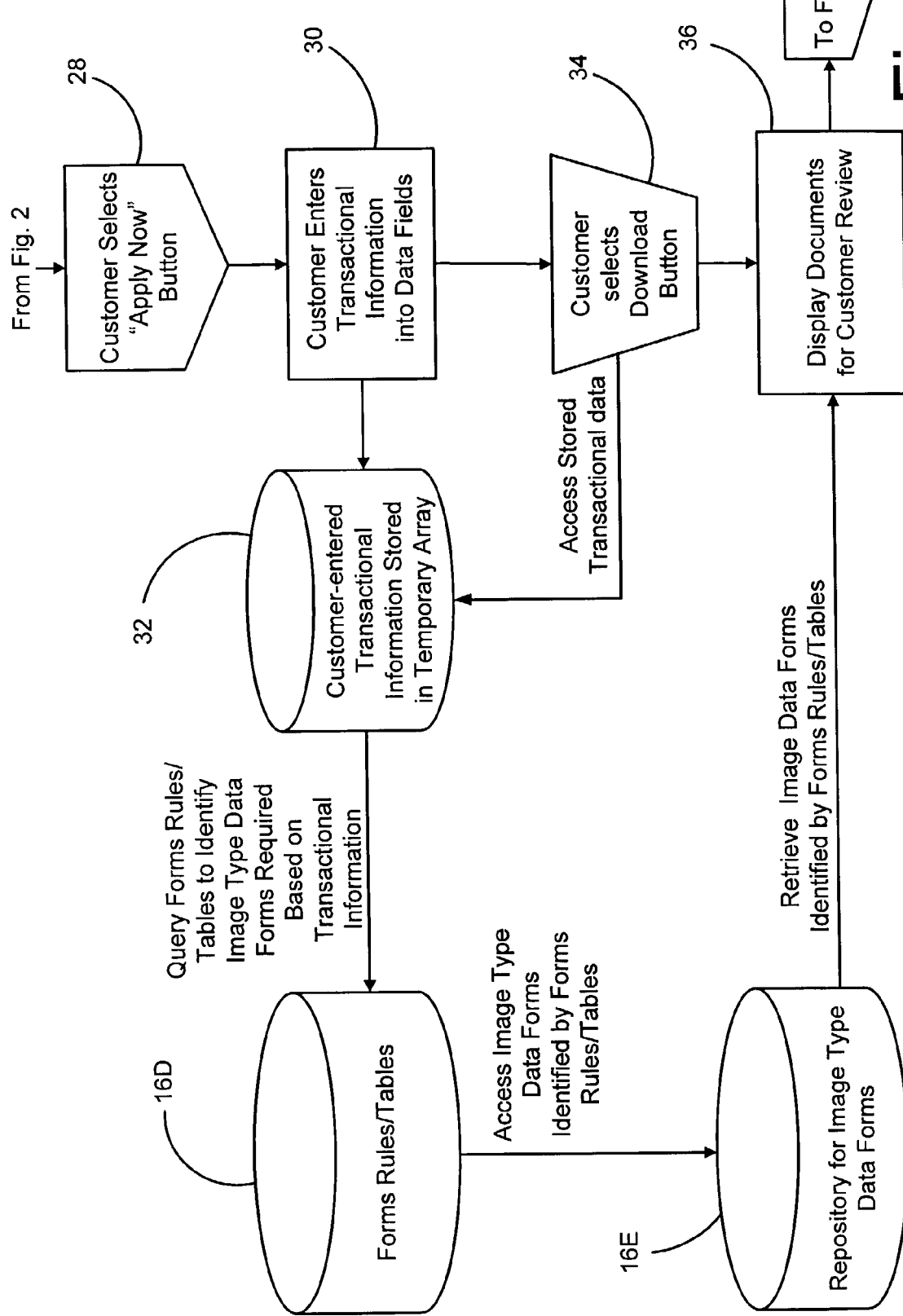
FIG. 3 is a process flow diagram illustrating the retrieval and incorporation of customer transactional data into geographical area specific electronic forms in one embodiment of the present invention.

Referring to FIG. 3, if the customer indicates a desire to purchase a particular product, he or she is prompted to provide transactional information into one or more data fields displayed upon the e-commerce site of the present invention, as illustrated by boxes (28 and 30). The present invention requests transactional information useful in determining which forms must be filled out to facilitate the online purchase of the desired product. For example, if the customer wishes to purchase a financial product, the processor (12) of the present invention will prompt the customer to provide transactional information such as whether the purchase is non-qualified or qualified, whether the purchase is a new purchase or an exchange, and/or whether the customer wishes to pay online or via conventional means. In one embodiment, transactional information is temporarily stored in an array, as illustrated by box (32).

Transactional information entered by the user is utilized to determine which forms must be completed in the customer's geographical area in order to purchase the desired product. Thus, in one embodiment, the processor (12) of the present invention utilizes both the stored customer information and the stored transactional information to determine 1) what geographical area's purchasing requirements apply, and 2) which forms must be completed to facilitate the purchase.

Once the correct forms to facilitate the transaction have been ascertained, the customer is prompted for a password or other identifier. The identifier is used to validate the identity of the customer so that confidential customer information may be retrieved from the pre-transaction repository. Once the system validates the identifier, customer information is retrieved from the pre-transaction repository and displayed to the customer on the e-commerce site of the present invention. The customer is then prompted to enter additional personal information that was not available on the pre-transaction repository into one or more data fields displayed upon the e-commerce site of the present invention. The present invention requests only the personal information required by the forms that will be presented for the customer's electronic authorization.

Figure 4:
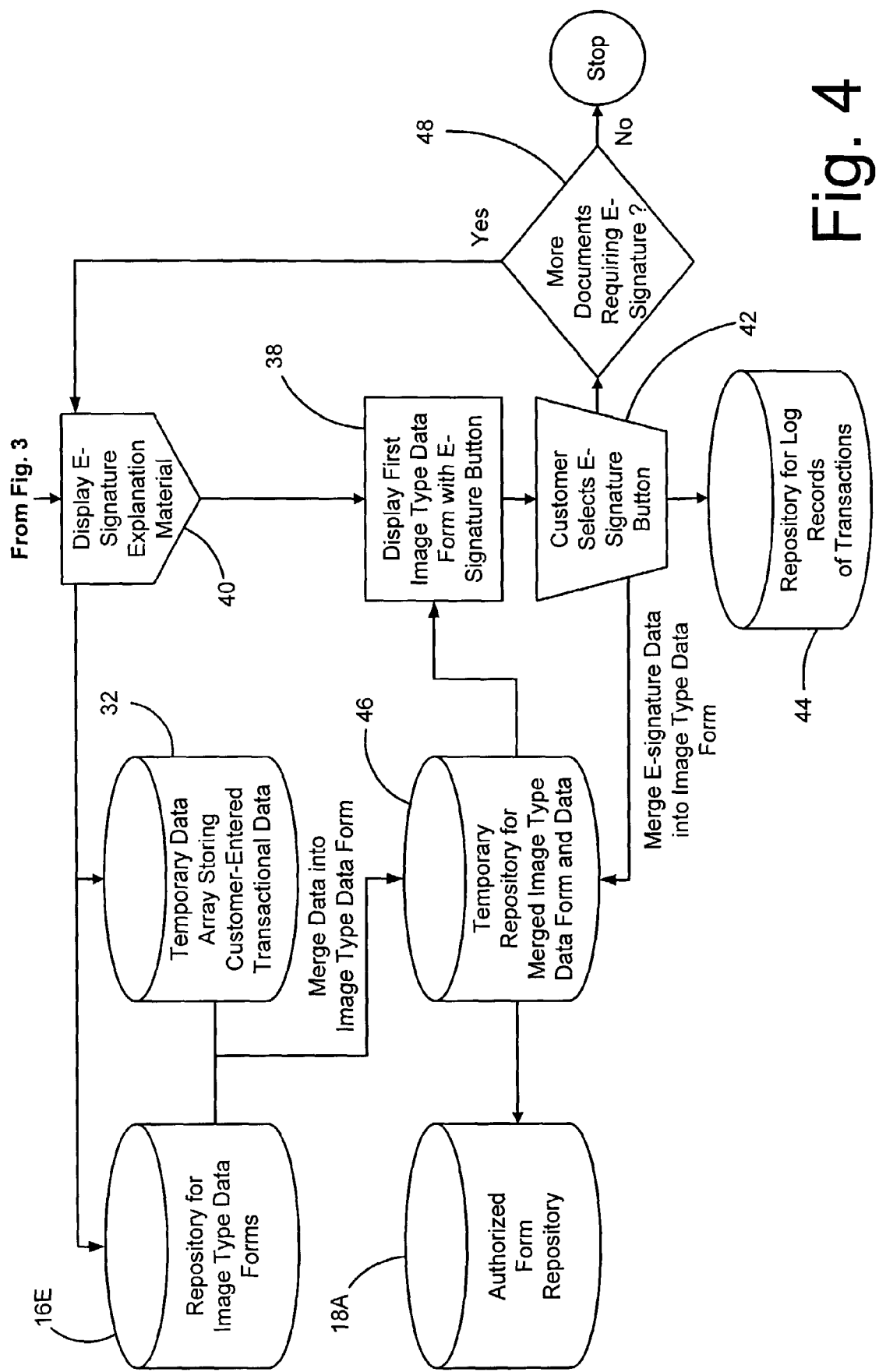
FIG. 4 is a process flow diagram illustrating the e-signature process of the present invention.

Referring to FIG. 4, once the accuracy of the transactional information is confirmed by the customer, the form is converted into image type format for display to the customer upon the e-commerce site (22) of the present invention, as illustrated by box (38). Image type data forms are utilized by the present invention to ensure that each form is displayed to the customer as required by applicable law. In one embodiment, the present invention utilizes Portable Document Format (PDF) to ensure that the form is accessible by a plurality of customers and appears substantially identical to its corresponding hard-copy version.

The present invention provides a novel methodology for consummating the sale of product(s) on line. In one embodiment, the completed image type data form is displayed upon the e-commerce site (22) along with an e-signature button and explanation material, as illustrated by boxes (38) and (40). At a minimum, the explanation material informs the customer that he or she may electronically authorize the submission of the displayed image type data form by selecting the e-signature button. In one embodiment, the explanation material includes one or more legal disclaimers designed to protect the e-commerce website owner and comply with notice requirements, if any. The act of selecting the e-signature button by the customer may comprise any signal from the customer intended to authorize the submission of the form including, but not limited to, clicking the mouse, speaking a sound, performing a keyboard stroke, etc., as illustrated by box (42).

Upon selection of the e-signature button, the processor (12) of the present invention merges the date and time of electronic authorization, i.e., selection of the e-signature button, into the image type data form. In one embodiment, this merged form is temporarily stored within a temporary repository, as illustrated by box (46).

Referring to FIGS. 1 and 4, the authorized form is then stored upon a post-transaction repository (18). The post-transaction repository (18) is described in a singular context for ease of illustration only. Thus, it should be understood that the post-transaction repository (18) may comprise one or more separate repositories (18A and 18B, respectively), each designed to retain electronic information. In one embodiment, the post-transaction repository (18) comprises an authorized form repository (18A) and a log repository (18B). In one embodiment, the authorized form containing customer information, transactional information, and e-signature time and date information, is stored upon the authorized form repository (18A).

Upon selection of the e-signature button, the processor (12) of the present invention creates a log record of the transaction for storage upon a log repository (18B), as illustrated by box (44). Thus, the present invention maintains dual records to ensure redundancy of the data in the event one device is ever compromised, and to ensure that any questions regarding when a transaction occurred can be quickly resolved.

The present invention is capable of retrieving and displaying multiple forms to the customer for his or her e-signature, as illustrated by box (48). This feature of the present invention is especially useful for product(s) which require multiple forms be "signed" by the customer. Again, the type and number of forms required is dependent on the geographical area within which the customer resides.

Although the present invention may be used in conjunction with a wide variety of online transactions, it is especially useful in facilitating financial transactions. To illustrate, the capability of the present invention to tailor product information to the geographical area of the customer makes the present invention ideally suited to facilitate the purchase of annuities. Different geographical areas and, particularly, each State of the United States of America, promulgates its own annuity purchasing guidelines. In doing so, each State requires one or more forms be filled out and signed by the customer in order to purchase an annuity.

The present invention allows each State's purchasing requirements to be met by maintaining one or more series of updated State approved forms that may be displayed and signed by the customer. The e-signature process of the present invention is capable of satisfying each State's notice requirements and allows the customer to view each form at substantially the same moment that he or she authorizes signature. In one embodiment, the present invention encourages customers to purchase annuities online through automatic withdrawal from their bank account. This is accomplished by providing the customer with one or more incentives as of the day of e-signature and authorization for automatic payment.

Elements of this application may be recited as being "coupled"; this terminology's use contemplates elements being connected together in such a way that there may be other components interstitially located between the specified elements, and that the elements so specified may be connected in fixed or movable relation one to the other. The term "coupled" should be contrasted with the use of the terminology "direct" connection which designates a relationship or joinder that does not have other components interstitially located there between, but the components may be fixed or movable with respect to one another. Still further, some structural relationships or orientations may be designated with the word "substantially". In those cases, it is meant that the relationship or orientation is as described, with allowances for variations that do not affect the cooperation of the described component or components.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

We claim:

1. A method of facilitating financial transactions over a computer network using an e-commerce site comprising the steps of:

a) providing a first repository containing customer information for a plurality of customers;

b) providing a second repository containing product information relating to a plurality of financial products;

c) receiving a request to review said product information from a first of said plurality of customers;

d) utilizing said customer information, determining which geographical area, including which State of the United States, is attributable to said first customer;

e) utilizing said State attributable to said first customer, retrieving one or more of said financial products from said second repository and displaying said one or more of said financial products upon said ecommerce site, each of said financial products being available for purchase in said first customer's State;

f) receiving, from said first customer, an indication that he or she wishes to purchase a first of said financial products;

g) displaying, upon said e-commerce site, a plurality of data fields associated with said first financial product, said data fields capable of receiving transactional information from said first customer, said transactional information being required in said first customer's State for the purchase of said first financial product, and receiving said transactional information from said first customer;

h) merging said transactional information into an image type data form, and displaying the image type data form containing said transactional information upon said e-commerce site for review by said customer, said image type data form having an appearance which is substantially identical to the appearance of the corresponding form required in said first customer's State for the purchase of said first financial product and containing substantially all the information found in said corresponding form;

i) displaying said image type data form, at least one legal disclaimer relating to said image type data form, and an e-signature button upon said e-commerce site, wherein said image type data form is presented upon said e-commerce site in portable document format;

j) upon said first customer's selection of said e-signature button, creating a log record of the transaction;

k) importing the time and date of e-signature button selection by said first customer into said image type data form; and l) storing said image type data form in a third repository.

2. The method of claim 1, wherein said first repository and said second repository are the same repository.

3. The method of claim 1, further comprising the additional step of:

retrieving said customer information from said first repository.

4. The method of claim 2, further comprising the additional steps of:

receiving product specific information from said first customer describing one or more types of said financial products said customer would prefer to review; and, utilizing said geographical area attributable to said first customer and said product specific information, retrieving one or more of said financial products and displaying said one or more financial products upon said e-commerce site, each of said financial products being available for purchase in said first customer's State.

5. The method of claim 1, further comprising the additional step of:

displaying one or more comparison points upon said e-commerce site for review by said plurality of customers.

6. The method of claim 1, wherein said transactional information received from said first customer into said data fields is presented upon said e-commerce site for validation by said first customer.

7. The method of claim 1, further comprising the additional step of:

crediting said first customer with one or more incentives in exchange for the purchase of said first financial product.

8. The method of claim 1, further comprising the additional step of:

if more than one of said image type data forms is required to purchase said first financial product, repeating steps g) through k) until said first customer has selected said e-signature button for each image type data form required in said first customer's State to purchase said first financial product.

* * * * *